(12) United States Patent
Baca

(10) Patent No.: US 6,508,612 B1
(45) Date of Patent: Jan. 21, 2003

(54) MILLING CUTTER CAPABLE OF USING INSERTS OF VARIOUS GEOMETRICAL SHAPES

(75) Inventor: John J. Baca, Youngstown, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 09/654,771

(22) Filed: Sep. 5, 2000

(51) Int. Cl.[7] .............................. B23C 5/20; B26D 1/12
(52) U.S. Cl. ......................... 407/43; 407/53; 407/113
(58) Field of Search .................................. 407/113, 114, 407/115, 116, 64, 43, 47, 51, 53

(56) References Cited

U.S. PATENT DOCUMENTS

| | | |
|---|---|---|
| 4,938,639 A | 7/1990 | Lockard |
| 5,145,294 A | 9/1992 | Flueckiger |
| 5,308,197 A | 5/1994 | Little |
| 5,346,336 A | 9/1994 | Rescigno |
| 5,536,119 A | 7/1996 | Werner et al. |
| 5,755,536 A * | 5/1998 | Vollmer et al. ............. 407/113 |
| 5,827,016 A | 10/1998 | Strand |
| 5,871,309 A * | 2/1999 | Svensson ...................... 407/40 |
| 6,050,751 A * | 4/2000 | Hellstrom ................... 407/104 |
| 6,053,671 A * | 4/2000 | Stedt et al. .................... 407/35 |
| 6,152,658 A * | 11/2000 | Satran et al. ............... 407/103 |
| 6,164,878 A * | 12/2000 | Satran et al. ............... 407/113 |
| 6,234,724 B1 * | 5/2001 | Satran et al. ................. 407/43 |

* cited by examiner

Primary Examiner—Henry Tsai
(74) Attorney, Agent, or Firm—Larry R. Meenan

(57) ABSTRACT

A milling cutter includes a generally cylindrical body whose outer periphery is formed with angularly spaced pockets capable of accepting indexable cutting inserts of various cutting geometrical shapes, such as inserts having octagonal, square or round cutting geometry's and a different seating geometry, such as a generally round seating geometry. This is accomplished by each insert including a generally frustconical transition face extending between the clearance or faceted faces and the rear face of the insert. This transition face provides a transition area between the various cutting geometry's and the generally round seating geometry.

14 Claims, 9 Drawing Sheets

MILLING CUTTER CAPABLE OF USING INSERTS OF VARIOUS GEOMETRICAL SHAPES

FIELD OF THE INVENTION

The present invention pertains to a milling cutter that uses indexable inserts. More particularly, the present invention relates to a milling cutter with a cutter body with pockets that are capable of removably securing indexable inserts of various geometrical shapes.

BACKGROUND OF THE INVENTION

Indexable cutting inserts are available in various shapes. One of the most common inserts is square and includes four cutting edges. Such an insert is especially useful in cases where it is necessary to mill a square or 90-degree shoulder in the workpiece being cut.

Octagonal inserts with eight cutting edges are also widely used. Adjacent cutting edges of such an insert extend at a 45-degree angle (commonly called a lead angle) relative to one another. Octagonal inserts are particularly advantageous in that a single insert possesses a relatively large number of alternately usable cutting edges.

Round inserts also are known. Such an insert may be infinitely indexed because the circular shape of the insert eliminates the requirement for indexing the insert through a particular angle. In addition to conventional round inserts, there are so-called hollow ground round inserts. The cutting face of a hollow ground insert is dished or relieved so as to produce an extremely sharp cutting edge on the insert.

Other inserts which are less widely used are irregularly shaped inserts having four cutting edges which are separated from one another by non-cutting edges. The cutting edges of a given insert may be located at a particular lead angle such as a 15-degree lead angle or a 30-degree lead angle.

Conventional tool holders are capable of indexing an insert with a particular cutting geometry. As a result, a different type of tool body is required to index a different type of insert. Such a practice of requiring a different type of tool body for a different type of insert is both expensive and impractical. Thus, it would be desirable to provide a tool holder capable of indexing inserts of various geometrical shapes.

SUMMARY OF THE INVENTION

An object of the invention is to provide a tool holder capable of indexing inserts of various geometrical shapes.

In one aspect of the invention, a milling cutter comprises a plurality of pockets positioned around an outer periphery of said cutter, an indexable cutting insert positioned within each of said pockets and means for securing each insert in its respective pocket. Each pocket includes a bottom, a first generally radially extending shoulder, and a second generally axially extending shoulder. Each insert includes a front face and a generally parallel rear face. The front face defines a polygonal cutting geometry and the rear face defining a substantially different seating geometry, such as a round seating geometry. A leading and circumferentially facing cutting face and a plurality of clearance faces extend between the front and rear faces. The cutting edges of each insert is defined as an intersection of one of the plurality of clearance faces with the cutting face. Each insert further includes a generally frustconical transition face extending between the clearance faces and the rear face for providing a transition area between the polygonal cutting geometry and the seating geometry of the insert. The securing means selectively permits indexing of each insert in its respective pocket to bring a selected one of the cutting edges into an active cutting position. The rear face of the insert is seated against the bottom of its respective pocket and two orthogonal clearance faces of the insert engage the shoulders of its respective pocket when the insert is positioned within its respective pocket.

In another aspect of the invention, a milling cutter comprises a plurality of pockets positioned around an outer periphery of said cutter, an indexable cutting insert positioned within each of said pockets and means for securing each insert in its respective pocket. Each pocket includes a bottom, a first generally radially extending shoulder, and a second generally axially extending shoulder. Each insert includes a front face and a generally parallel rear face. The front face defines a round cutting geometry and the rear face defining a substantially round seating geometry. A leading and circumferentially facing cutting face and a plurality of clearance faces extend between the front and rear faces. The cutting edges of each insert is defined as an intersection of one of the plurality of clearance faces with the cutting face. Each insert further includes a plurality of faceted faces and a generally frustconical transition face extending between the plurality of faceted faces and the rear face for providing a transition area between the faceted faces and the round seating geometry of the insert. The securing means selectively permits indexing of the insert in its respective pocket to bring a selected one of the cutting edges into an active cutting position. The rear face of the insert is seated against the bottom of its respective pocket and two orthogonal faceted faces of the insert engage the shoulders of its respective pocket when the insert is positioned within its respective pocket.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
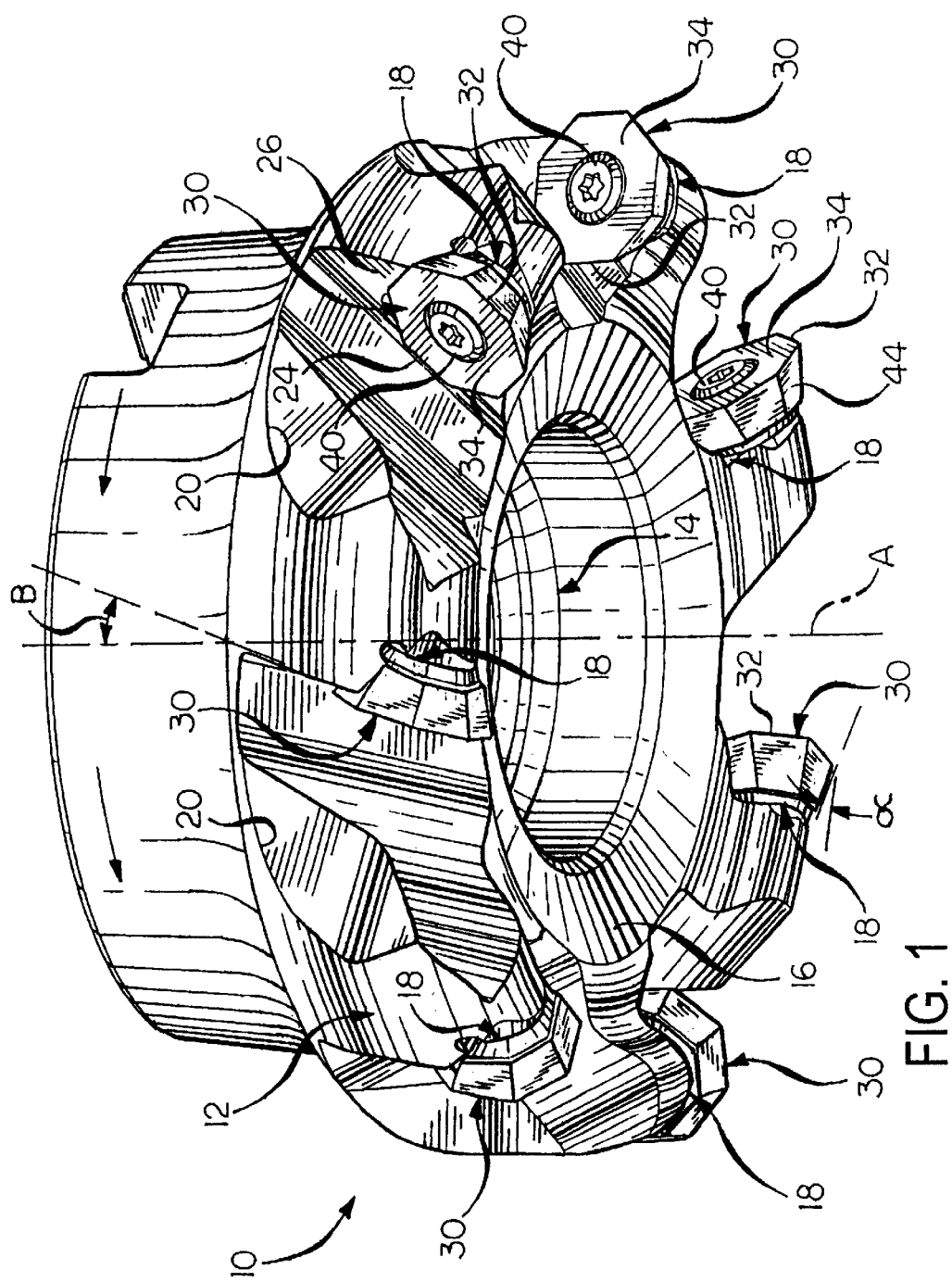
FIG. 1 is a perspective view of a cutter in accordance with the invention.

One embodiment of a milling cutter 10 capable of using inserts of various cutting geometry's is shown in FIG. 1. The milling cutter 10 includes a generally cylindrical body 12 made of steel and having a central axis, A, about which the body 12 is adapted to be rotated. A bore 14 is formed in the center portion of the body 12 for receiving a tool shank adapted to be coupled to a power-rotated spindle of a milling machine (not shown). It will be understood that the invention is not limited by the milling cutter 20 and that the invention can be practiced using any suitable cutter, such as a Bridgeport mill, for milling the surface of a workpiece in order to remove material from the workpiece to form the workpiece surface into a desired sized and shape.

The body 12 includes a lower working end 16 that faces downwardly toward the workpiece. Several pockets 18 are formed in and spaced angularly around the outer periphery of the lower end portion of the body 12. As explained in more detail below, each pocket 18 is capable of receiving indexable inserts for performing the cutting operation on the workpiece. For illustrative purposes only, the body 12 of the cutter 10 includes 7 pockets. It will be understood that the invention is not limited by the number of pockets 18, and that the invention can be practiced with any desired number of pockets. Typically, the number of pockets 18 is a function of the diameter of the body 12. For example, a cutter with a 2" diameter may include 3 pockets, while a cutter with a 6" diameter may include 8 pockets. A gullet 20 is form in the body 12 adjacent each pocket 18 to enable chips cut from the workpiece to flow away from the pockets 18 and clear of the body 12.

One aspect of the invention is that the pockets 18 of the body 12 are capable of universally accepting indexable inserts of various geometrical shapes, thereby avoiding the need of a machine shop to stock a large number of different types of cutter bodies for different type of inserts. In addition, the cutter 10 is capable of removing metal at a significantly faster rate than conventional cutters, thereby significantly increasing efficiency as compared to conventional cutters.

Figure 2:
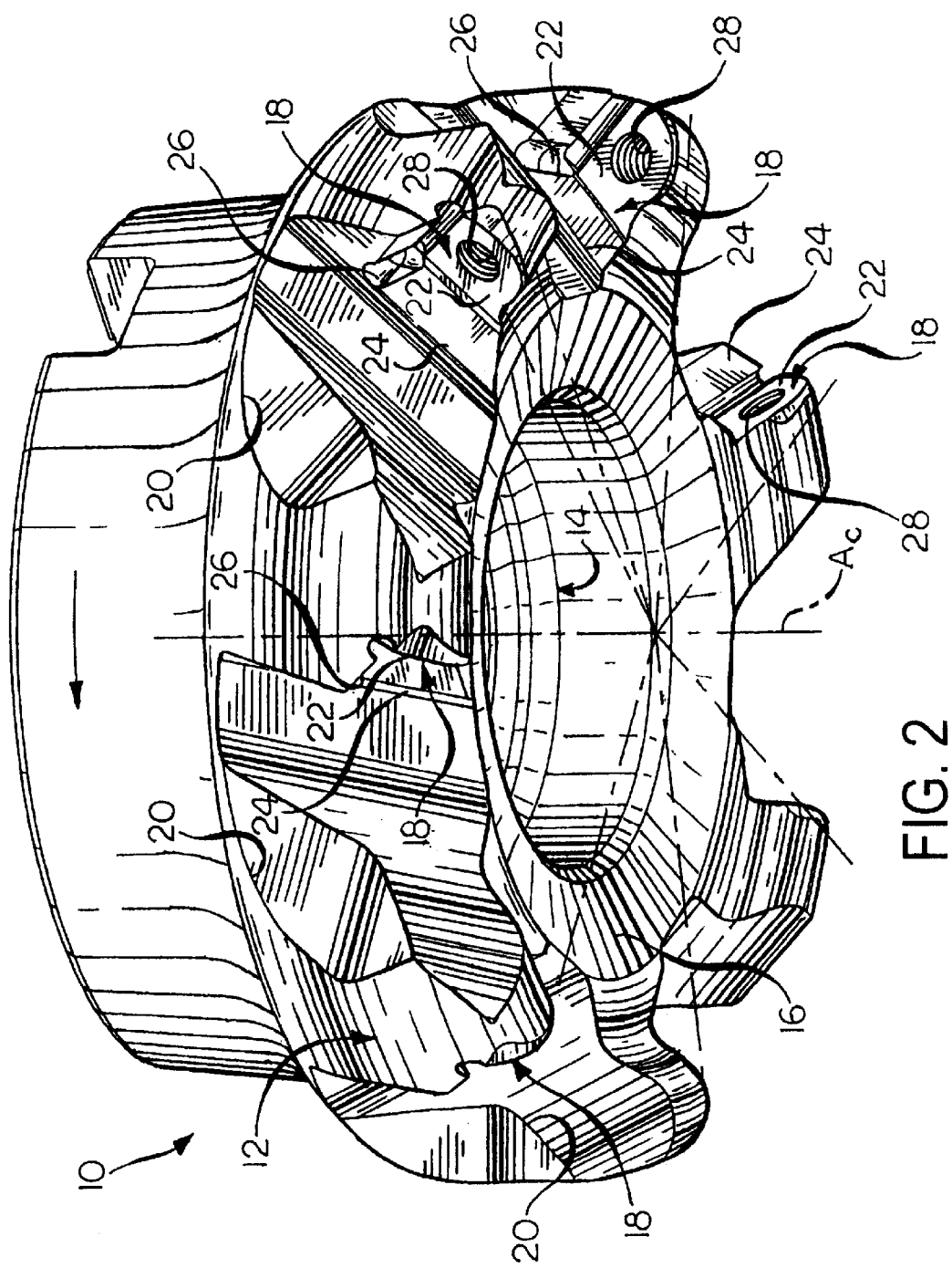
FIG. 2 is a perspective view of the cutter of FIG. 1 without the inserts.
Figure 3:
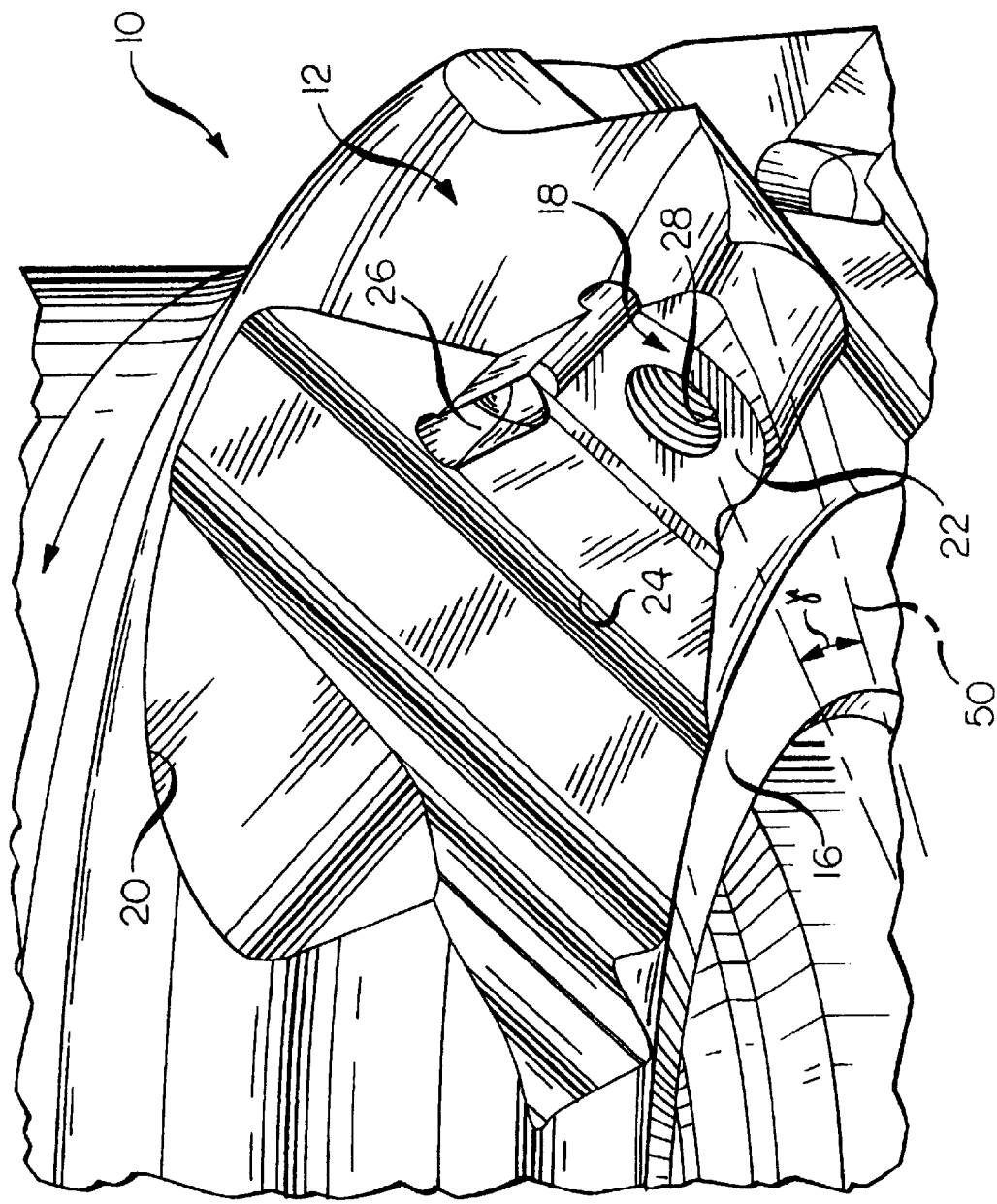
FIG. 3 is an enlarged, partial view of the insert-receiving pocket of the cutter of FIG. 2.

Referring now to FIGS. 2 and 3, each pocket 18 includes a bottom or flat platform 22 that faces generally circumferentially in the direction of rotation of the cutter 10. A first generally radially extending surface or shoulder 24 is formed at the lower end of the pocket 18. A second generally axially extending surface or shoulder 26 is formed adjacent the outer side of the pocket 18. A tapped hole 28 is formed approximately at the center of the platform 18 and extends at right angles thereto.

Figure 4:
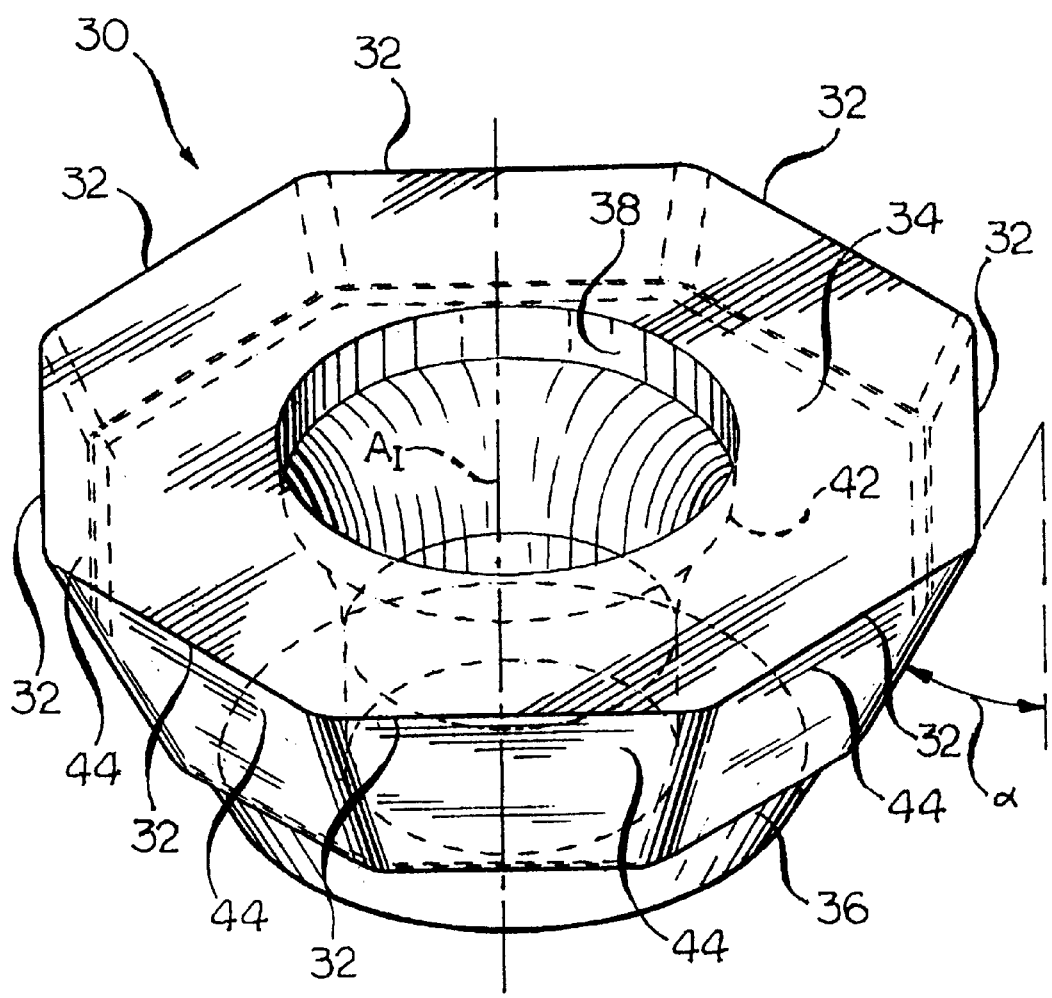
FIG. 4 is a perspective view of an octagonal insert having a round seating geometry for use in the cutter of the invention.
Figure 5:
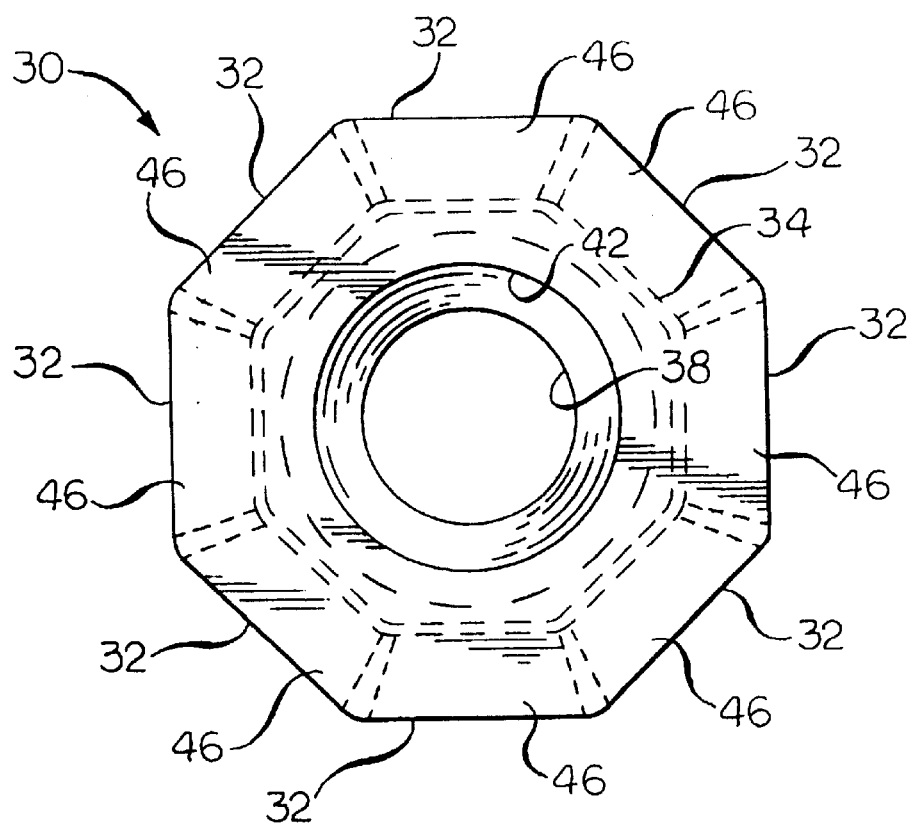
FIG. 5 is a top plan view of the insert of FIG. 4.
Figure 6:
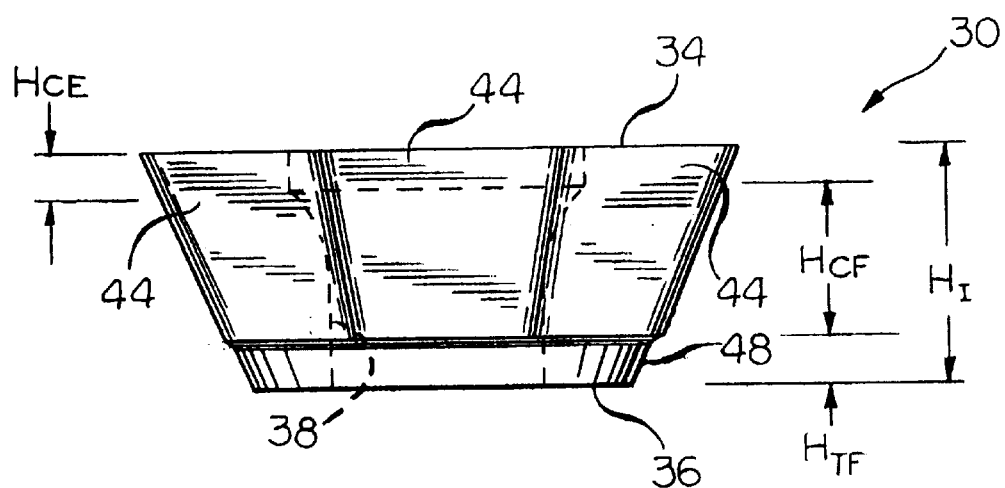
FIG. 6 is a side elevational view of the insert of FIG. 4.

Referring now to FIGS. 4–6, the flat platform 22 of the cutter 10 is capable of accommodating, for example, an octagonal insert 30 having a round seating geometry and an octagonal cutting geometry. The octagonal insert 30 includes eight angularly spaced cutting edges 32 of substantially equal length. The insert 30 includes a front face 34 and a generally parallel rear face 36. The front face 34 defines a substantially octagonal cutting geometry and the rear face 36 defines a substantially round seating geometry. A hole 38 extends between the front and rear faces 34, 36 and through the center of the insert 30. The hole 38 is sized to receive the shank of a locking screw 40 (FIG. 1) having a frustoconical head. The screw 40 is adapted to be threaded into the tapped hole 28 in the platform 22 to lock the insert 30 in the pocket 18. Preferably, a frustoconical countersink 42 is formed in the front face 34 of the insert 30 around the hole 38 to enable the head of the locking screw 40 to be flush with the front face 34 of the insert 30 to prevent the head of the screw 40 from interfering with the flow of chips from the workpiece when locking the insert 30 in the pocket 18.

In addition to the relatively wide front and rear faces 34, 36, the insert 30 includes eight comparatively narrow edge surfaces 44 which extend between the front and rear faces 34, 36 and which define clearance faces. The clearance faces 44 are not perpendicular to the front and rear faces 34, 36, but are inclined at a positive clearance angle, $\alpha$, greater than 0 degrees (that is, the angle formed between each side clearance face 44 and a plane oriented parallel to the center axis, $A_I$, of the insert 30, as shown in FIG. 4). Each cutting edge 32 of the insert 30 is defined as the intersection of one of the clearance faces 44 with a cutting face 46. The cutting face 46 may be any desired shape, such as frustoconical, flat, and the like. A generally frustoconical transition face 48 extends between the clearance faces 44 and the rear face 36 of the insert 30 to provide a transition area between the octagon cutting geometry of the clearance faces 44 and the generally round seating geometry of the rear face 36. In conventional inserts, the cutting geometry and the seating geometry are both generally octagonal, unlike the invention which includes the octagonal cutting geometry and the generally round seating geometry.

Referring now to FIG. 1, the rear face 36 of the octagonal insert 30 is accepted and seated against the flat platform or bottom 22 of the insert-receiving pocket 18. When the insert 30 is seated, its lowermost cutting edge 32 is located in active cutting position and defines the active cutting edge of the insert 30. In the installed position, the rear face 36 is clamped against the platform 22 of the pocket 18 by the screw 40 while the clearance face 44 which is diametrically opposite the active cutting edge 32 is in abutting engagement with the radially extending shoulder 24 of the pocket 18. The radially innermost clearance face 44 of the insert 30 is forced against and is backed by the axially extending shoulder 26 of the pocket 18 (FIG. 1). Thus, two orthogonal clearance faces 44 of the insert 30 are clamped against the shoulders 24, 26 of the insert-receiving pocket 18 when the insert 30 is installed in the body 12.

When seated, the cutting edge 32 defining the active cutting edge preferably extends above the shoulders 24, 26 at a height, $H_{CE}$, of approximately 0.100 inches for a clearance face 44 having a height, $H_{CF}$, of approximately 0.180 inches and the insert 30 having a total height, $H_I$, of approximately 0.250 inches (FIG. 6). In other words, the transition face 48 has a height, $H_{TF}$, of approximately 0.010 inches. It will be appreciated that the invention is not limited by the dimensions of the insert 30, and that the invention can be practiced with any desired dimensions for optimizing the cutting performance of the insert 30.

It will be understood that the invention is not limited by the number of clearance faces 44 of the insert 30 that are clamped against the shoulders 24, 26 of the pocket 18. For example, the body 12 may includes a triangular-shaped pocket having three shoulders, rather than two shoulders 24, 26 of the illustrated pocket 18. In this example, each shoulder 24, 26 of the pocket 18 would be approximately 135 degrees with respect to each other to engage the three clearance faces of the insert, rather than the two orthogonal clearance faces 44 of the illustrated embodiment.

As shown in FIG. 1, the platform 22 of each pocket 18 is inclined vertically relative to an axis, $A_C$, of the cutter 10 so as to cause the active cutting edge 32 of each insert 30 to be disposed at a positive axial rake angle, $\beta$, greater than 0 degrees. In other words, the angle, $\beta$, causes the front face 34 of the insert 30 to be located in a plane which lies behind and is inclined rearwardly from a plane containing the active cutting edge 32 and disposed parallel to the axis, $A_C$, of the cutter 10. The platform 22 also is offset or inclined relative to a radius of the body 12 so as to cause the active cutting edge to be disposed at a negative radial rake angle, $\gamma$. In other words, the cutting edge 32 is positioned ahead of a radial line 50 that extends parallel to the active cutting edge 32 (FIG. 3). The magnitude of the negative radial rake angle, γ, is dependent on the radius of the body 12. For example, the radial rake angle, γ, may be about 5 to 6 degrees in a cutter with an effective diameter of about 4 inches.

During cutting, the inclined lower clearance face 44 of the active cutting edge 32 progresses away from the working end 16 of the body 12 as the clearance face proceeds from the front face 34 toward the rear face 36 of the insert 30 at the positive clearance angle, α, greater than 0 degrees. This prevents the lower clearance face 44 from rubbing against the upwardly facing surface of the workpiece. The clearance face 44 of the adjacent cutting edge 32 in an outward direction also is prevented from rubbing against the shoulder of the workpiece by virtue of the clearance angle, α.

In operation, the screw 40 can be removed and the insert indexed, for example, 45 degrees to bring an unworn edge into active cutting position when the active cutting edge 32 of each octagonal insert 30 becomes worn to the point of ineffectiveness. With the illustrated octagonal inserts 30, each insert may be indexed to eight different positions (that is, a different position for each cutting edge 32) before replacement of the insert is necessary.

Figure 7:
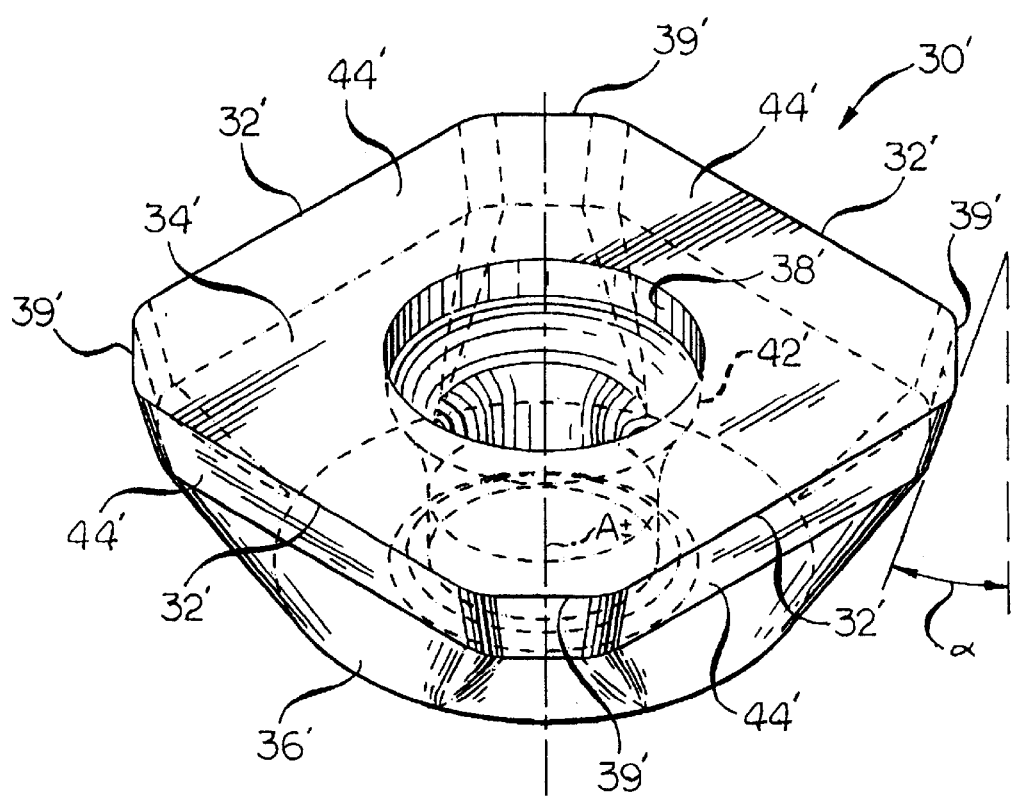
FIG. 7 is a perspective view of a square-faceted insert having a round seating geometry for use in the cutter of the invention.
Figure 8:
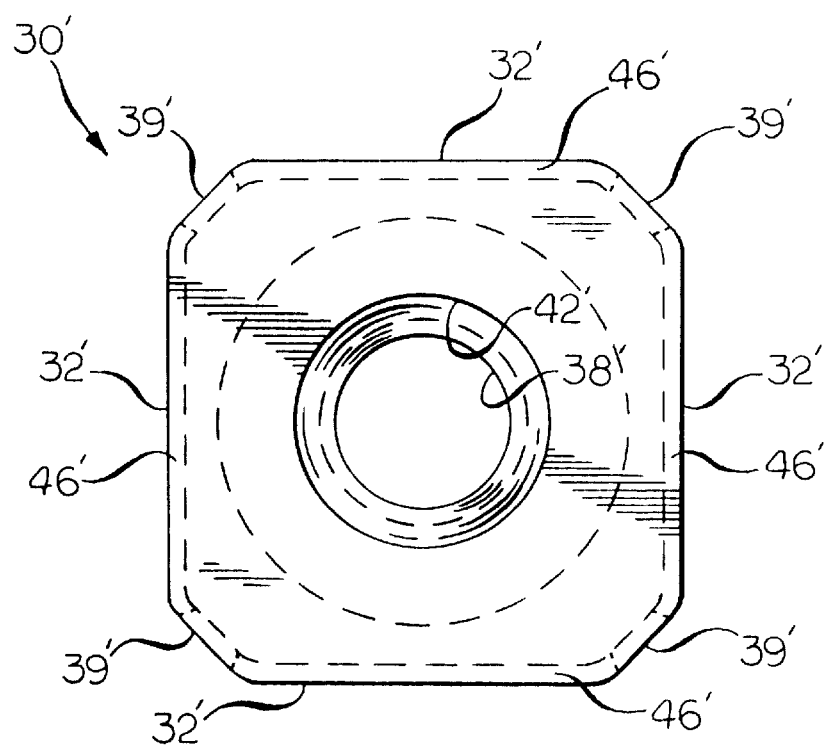
FIG. 8 is a top plan view of the insert of FIG. 7.
Figure 9:
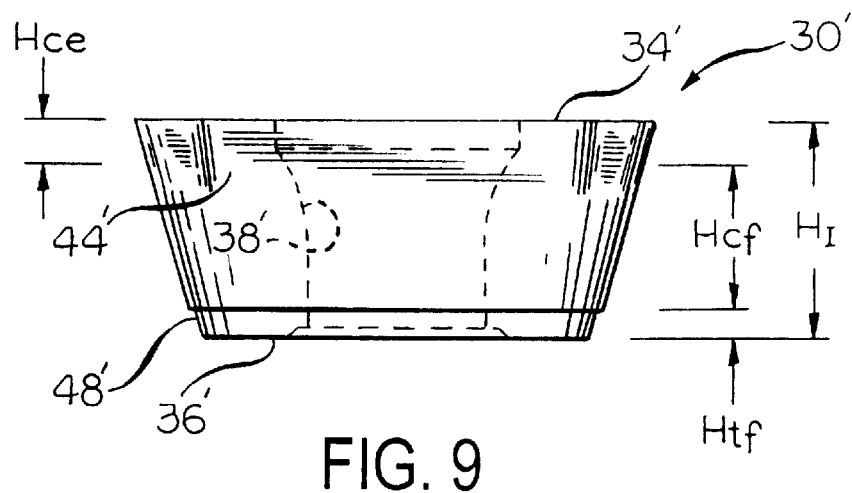
FIG. 9 is a side elevational view of the insert of FIG. 7.

As mentioned earlier, one aspect of the invention is that the body 12 is not limited to use with octagonal inserts 30. For example, each pocket 18 of the cutter 10 may accommodate a square insert 30', as shown in FIGS. 7–9. The square insert 30' includes four angularly spaced cutting edges 32' of substantially equal length, a front face 34' and a generally parallel rear face 36'. The front face 34' defines a substantially square cutting geometry and the rear face 36' defines a substantially round seating geometry. A hole 38' extends between the front and rear faces 34', 36' and through the center of the insert 30'. Similar to the hole 38 of the octagonal insert 30, the hole 38' is capable of receiving the screw 40 for securing the insert 30' to the body 12. Preferably, a frustoconical countersink 42' is formed in the front face 34' of the insert 30' to enable the head of the locking screw 40 to be flush with the front face 34' of the insert 30'. For illustrative purposes only, the square insert 30' may includes facets 39' at the intersection of each cutting edge 32'.

The insert 30' also includes four edge surfaces 44' which extend between the front and rear faces 34', 36' and which define clearance faces. The clearance faces 44' are not perpendicular to the front and rear faces 34', 36', but are inclined at a positive clearance angle, α, greater than 0 degrees (that is, the angle formed between each side clearance face 44' and a plane oriented parallel to the center axis, $A_I$, of the insert 30', as shown in FIG. 7). Each cutting edge 32' of the insert 30' is defined as the intersection of one of the clearance faces 44' with a cutting face 46'. The cutting face 46' may be any desired shape, such as frustoconical, flat, and the like. Similar to the octagonal insert 30, a generally frustoconical transition face 48' extends between the clearance faces 44' and the rear face 36' of the insert 30' to provide a transition area between the square cutting geometry of the clearance faces 44' and the generally round seating geometry of the rear face 36'.

When the rear face 36' of the square insert 30' is accepted and seated against the flat platform or bottom 20 of the insert-receiving pocket 18, two orthogonal clearance faces 44' of the insert 30' are clamped against the shoulders 24, 26 of the insert-receiving pocket 18. When seated, the cutting edge 32' defining the active cutting edge preferably extends above the shoulders 24, 26 at a height, $H_{CE}$, of approximately 0.100 inches for a clearance face 44' having a height, $H_{CF}$, of approximately 0.180 inches and the insert 30' having a total height, $H_I$, of approximately 0.250 inches (FIG. 9). In other words, the transition face 48' has a height, $H_{TF}$, of approximately 0.010 inches. It will be appreciated that the invention is not limited by the dimensions of the insert 30', and that the invention can be practiced with any desired dimensions for optimizing the cutting performance of the insert 30'.

Figure 10:
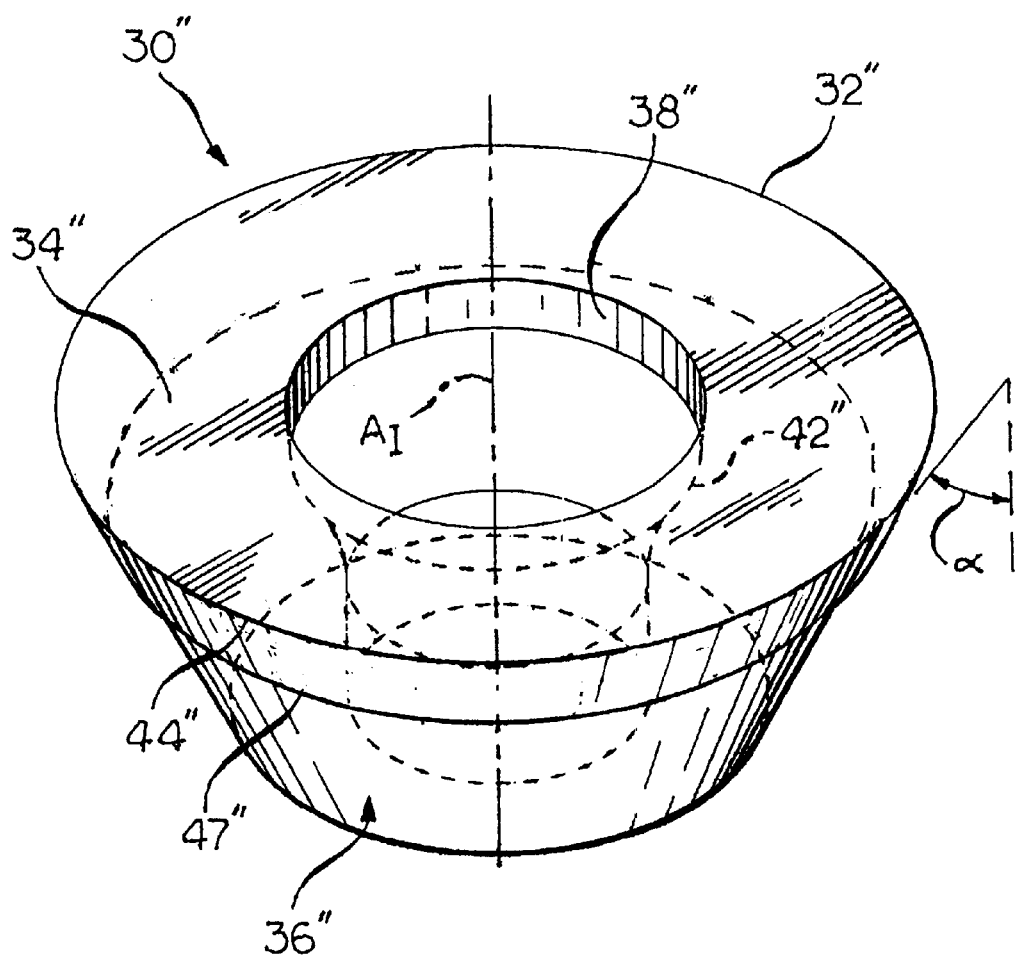
FIG. 10 is a perspective view of a round insert having a round seating geometry for use in the cutter of the invention.
Figure 11:
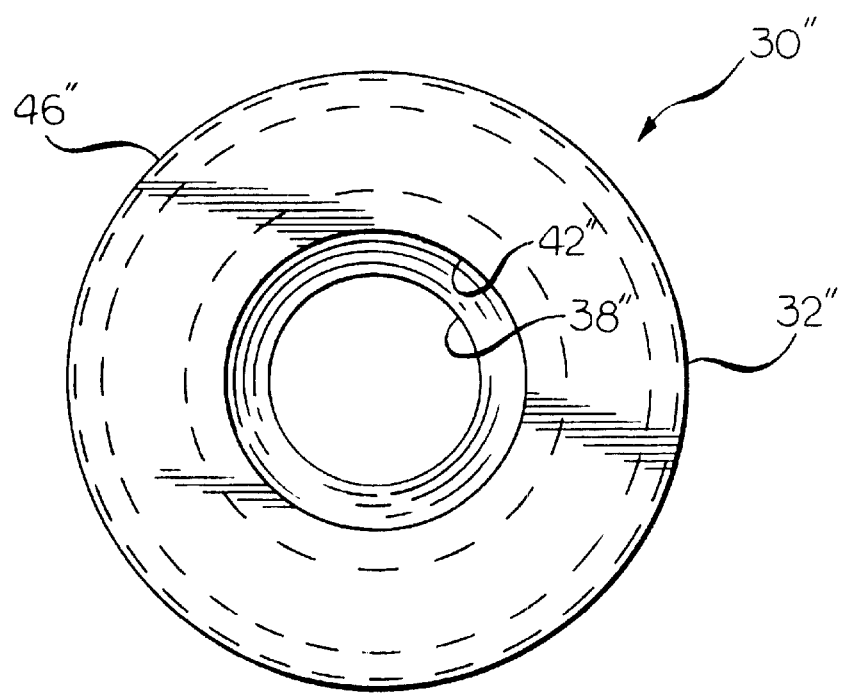
FIG. 11 is a top plan view of the insert of FIG. 10.
Figure 12:
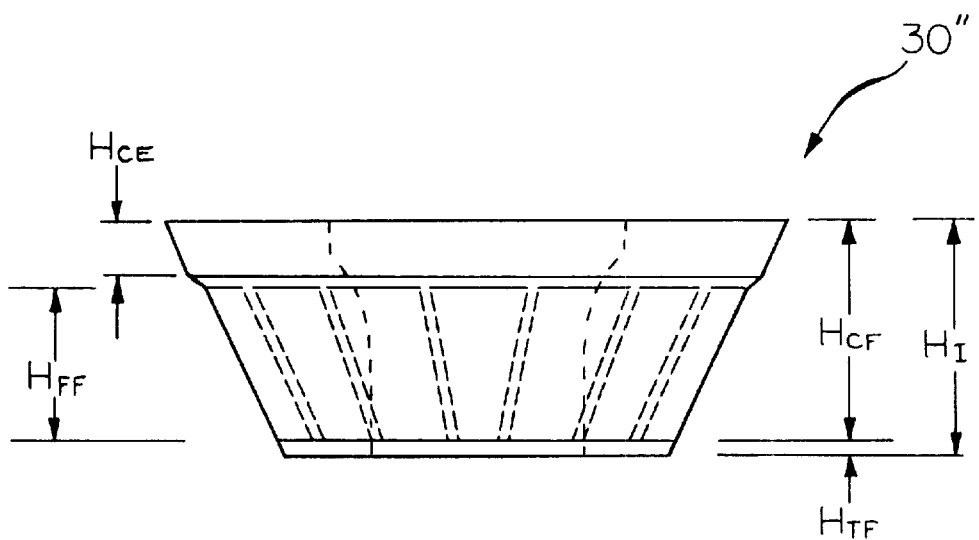
FIG. 12 is a side elevational view of the insert of FIG. 10.

FIGS. 10–12 show a round insert 30" which can be seated in the pockets 18 of the cutter 10. The insert 30" includes a cutting edges 32", a front face 34" and a generally parallel rear face 36". The front face 34" defines a substantially round cutting geometry and the rear face 36" defines a substantially round seating geometry. A hole 38" extends between the front and rear faces 34", 36" and through the center of the insert 30". Similar to the hole 38 of the octagonal insert 30, the hole 38" is capable of receiving the screw 40 for securing the insert 30" to the body 12. Preferably, a frustoconical countersink 42" is formed in the front face 34" of the insert 30" to enable the head of the locking screw 40 to be flush with the front face 34" of the insert 30".

The insert 30" also includes a round edge surface 44' which extends between the front and rear faces 34", 36" and which defines a clearance face. Similar to the inserts 30, 30', the clearance face 44" is not perpendicular to the front and rear faces 34", 36", but is inclined at a positive clearance angle, α, greater than 0 degrees (that is, the angle formed between each side clearance face 44" and a plane oriented parallel to the center axis, $A_I$, of the insert 30", as shown in FIG. 10). The cutting edge 32" of the insert 30" is defined as the intersection of the clearance face 44" with a cutting face 46". The cutting face 46" may be any desired shape, such as frustoconical, flat, and the like. The insert 30" also includes a plurality of faceted faces 47" for indexing the insert 30" in the pocket 18 of the cutter 10.

Similar to the inserts 30, 30', a generally frustconical transition face 48" extends between the faceted faces 47" and the rear face 36" of the insert 30" to provide a transition area between the faceted indexing faces 47" and the generally round seating geometry provided by the rear face 36". Even though the invention is not limited by the number of faceted faces 47", it is desirable that the invention be practiced with a large number of faceted faces 47" to enable the insert 30" to be indexed at a larger number of positions. As the number of faceted faces 47" approaches infinity, the insert 30" can infinitely indexable through any desired angle and is not limited to being indexed through a finite angle, unlike the octagonal insert 30 and the square insert 30'.

When the rear face 36" of the round insert 30" is accepted and seated against the flat platform or bottom 20 of the insert-receiving pocket 18, two orthogonal faceted faces 47" of the insert 30" are clamped against the shoulders 24, 26 of the insert-receiving pocket 18. When seated, the cutting edge 32" defining the active cutting edge preferably extends above the shoulders 24, 26 at a height, $H_{CE}$, of approximately 0.100 inches, a faceted face 47" having a height, $H_{FF}$, of approximately 0.180 inches and a clearance face 44" having a height, $H_{CF}$, of approximately 0.240 inches for an insert 30" having a total height, $H_I$, of approximately 0.250 inches (FIG. 12). In other words, the transition face 48" has a height, $H_{TF}$, of approximately 0.010 inches. It will be appreciated that the invention is not limited by the dimensions of the insert 30', and that the invention can be practiced with any desired dimensions for optimizing the cutting performance of the insert 30'.

As described above, the milling cutter 10 of the invention is capable of using inserts of various geometrical shapes by providing a round seating geometry for the various cutting geometry's. It should be understood that the cutter can be practiced with providing an insert with any seating geometry that is consistent between the various insert cutting geometry's. For example, the cutter may be used for inserts of various cutting geometry's having a polygonal seating geometry, such as a triangular, square, and the like, rather than a round seating geometry. In this example, the transition face of the insert would provide a transition area between the various cutting geometry's and the polygonal seating geometry.

It has been shown that the cutter is highly efficient and provides an extremely free cutting action and free flow of chips along the front faces of the inserts due to the absence of clamps or other obstructions in front of the inserts.

The patents and publications referred to herein are hereby incorporated by reference.

Having described presently preferred embodiments the invention may be otherwise embodied within the scope of the appended claims.

What is claimed is:

1. A milling cutter capable of universally accepting indexable cutting inserts of various geometrical shapes, said milling cutter comprising:

a plurality of pockets positioned around an outer periphery of said cutter, each pocket including a bottom, a first generally radially extending shoulder, and a second generally axially extending shoulder;

an indexable cutting insert positioned within each of said pockets, each insert including a front face and a generally parallel rear face, the front face defining a polygonal cutting geometry and the rear face defining a generally round seating geometry, a leading and circumferentially facing cutting face and a plurality of clearance faces extending between the front and rear faces, the cutting edges of each insert being defined as an intersection of one of the plurality of clearance faces with the cutting face, each insert further including a generally frustoconical transition face extending between the clearance faces and the rear face for providing a transition area between the polygonal cutting geometry and the seating geometry of said insert; and means for securing each insert in its respective pocket and selectively releasable to permit indexing of each insert in its respective pocket to bring a selected one of said cutting edges into an active cutting position, wherein the rear face of each insert is seated against the bottom of its respective pocket and two orthogonal clearance faces of each insert engage the shoulders of its respective pocket when each insert is positioned within its respective pocket.

2. A milling cutter according to claim 1 wherein the cutting geometry of each of said inserts is generally octagonal in shape and the seating geometry of each of said inserts is generally round in shape.

3. A milling cutter according to claim 1, wherein the cutting geometry of each of said inserts is generally square in shape and the seating geometry of each of said inserts is generally round in shape.

4. A milling cutter according to claim 1, wherein the clearance faces of each insert is inclined at a clearance angle, α, of at least 15 degrees with respect to the front and rear faces of each insert.

5. A milling cutter according to claim 1, wherein the active cutting edge of each insert is disposed at a positive axial rake angle, β, greater than 0 degrees with respect to a vertical axis of said cutter.

6. A milling cutter according to claim 1, wherein the active cutting edge of each insert is disposed at a negative radial rake angle, γ, greater than 0 degrees with respect to a radius from a vertical axis of said cutter.

7. A milling cutter according to claim 1, wherein the active cutting edge extends above the shoulders at a height of approximately 0.100 inches when the rear face is seated against the bottom of each pocket.

8. A milling cutter according to claim 1, wherein said securing means comprises a hole extending between the front and rear faces of each insert and a locking screw adapted to be threaded into the tapped hole.

9. A milling cutter capable of universally accepting indexable cutting inserts of various geometrical shapes, said milling cutter comprising:

a plurality of pockets positioned around an outer periphery of said cutter, each pocket including a bottom, a first generally radially extending shoulder, and a second generally axially extending shoulder;

an indexable cutting insert positioned within each of said pockets, each insert including a front face and a generally parallel rear face, the front face defining a round cutting geometry and the rear face defining a substantially round seating geometry, a leading and circumferentially facing cutting face and a plurality of clearance faces extending between the front and rear faces, the cutting edges of each insert being defined as an intersection of one of the plurality of clearance faces with the cutting face, each insert further including a plurality of faceted faces and a generally frustoconical transition face extending between the plurality of faceted faces and the rear face for providing a transition area between the faceted surface faces and the round seating geometry of said insert; and means for securing each insert in its respective pocket and selectively releasable to permit indexing of each insert in its respective pocket to bring a selected one of said cutting edges into an active cutting position, wherein the rear face of each insert is seated against the bottom of its respective pocket and two orthogonal faceted faces of each insert engage the shoulders of its respective pocket when each insert is positioned within its respective pocket.

10. A milling cutter according to claim 9, wherein the clearance faces of each insert is inclined at a clearance angle, α, of at least 15 degrees with respect to the front and rear faces of each insert.

11. A milling cutter according to claim 9, wherein the active cutting edge of each insert is disposed at a positive axial rake angle, β, greater than 0 degrees with respect to a vertical axis of said cutter.

12. A milling cutter according to claim 9, wherein the active cutting edge of each insert is disposed at a negative radial rake angle, γ, greater than 0 degrees with respect to a radius from a vertical axis of said cutter.

13. A milling cutter according to claim 9, wherein the active cutting edge extends above the shoulders at a height of approximately 0.100 inches when the rear face is seated against the bottom of each pocket.

14. A milling cutter according to claim 9, wherein said securing means comprises a hole extending between the front and rear faces of each insert and a locking screw adapted to be threaded into the tapped hole.

* * * * *